(12) United States Patent
Degtiarov et al.

(10) Patent No.: US 12,487,766 B1
(45) Date of Patent: Dec. 2, 2025

(54) DURABLE ASYNCHRONOUS REPLICATION IN A DISTRIBUTED STORAGE SYSTEM

(71) Applicant: Amazon Technologies, Inc., Seattle, WA (US)

(72) Inventors: Arkady Michael Degtiarov, Newton, MA (US); Hyong Hark Lee, Boston, MA (US); Daivat Bhatt, Cambridge County, MA (US); Neil Patel, Cambridge, MA (US); Jaykumar Patel, Cambridge, MA (US); Hasti Gheibi Dehnashi, Dorchester, MA (US); Yuchen Guo, Waltham, MA (US); Pari Jean Fariborz Garay, Belmont, MA (US); Osvaldo Vallejo Zamora, Fowler, CA (US); Anas Daboussi, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 18/344,365

(22) Filed: Jun. 29, 2023

(51) Int. Cl.
G06F 3/06 (2006.01)

(52) U.S. Cl.
CPC ............ G06F 3/065 (2013.01); G06F 3/0619 (2013.01); G06F 3/067 (2013.01)

(58) Field of Classification Search
CPC ......... G06F 3/065; G06F 3/0619; G06F 3/067
See application file for complete search history.

(56) References Cited

U.S. PATENT DOCUMENTS

| | | | |
|---|---|---|---|
| 10,581,751 B1* | 3/2020 | Viswanathan | H04L 67/1097 |
| 2005/0210081 A1* | 9/2005 | Fleck | G06F 11/1474 |
| | | | 714/E11.131 |
| 2007/0050573 A1 | 3/2007 | Arakawa et al. | |
| 2010/0030986 A1* | 2/2010 | Shinozaki | G06F 3/0613 |
| | | | 711/E12.001 |
| 2016/0085475 A1* | 3/2016 | Schmidt | H04L 45/16 |
| | | | 711/154 |
| 2016/0179416 A1 | 6/2016 | Mutha et al. | |
| 2019/0020533 A1* | 1/2019 | Wang | G06F 16/9014 |
| 2020/0012568 A1 | 1/2020 | Vig et al. | |
| 2020/0401313 A1* | 12/2020 | Cheru | G06F 3/0614 |
| 2021/0165573 A1* | 6/2021 | Demoor | G06F 11/1415 |
| 2021/0165767 A1* | 6/2021 | D'Halluin | G06F 16/1734 |
| 2022/0179748 A1 | 6/2022 | Agarwal et al. | |
| 2023/0400995 A1 | 12/2023 | Waghmare et al. | |

\* cited by examiner

*Primary Examiner* — Michael Krofcheck
(74) *Attorney, Agent, or Firm* — Knobbe, Martens, Olson & Bear, LLP

(57) ABSTRACT

Systems and methods are provided for durable asynchronous replication in a distributed storage system. A storage system may commit a transaction comprising saving a data object to a persistent object storage location and saving a replication marker to a first persistent storage directory for pending replication tasks, wherein the replication marker comprises replication data for replicating the data object to a remote storage system, and wherein the first persistent storage directory comprises a replication queue; determine, based on a presence of the replication marker in the first persistent storage directory, to dequeue the replication marker from the replication queue; move the replication marker to a second persistent storage directory for in-process replication tasks; attempt replication of the data object to the remote storage system; and move the replication marker to a third persistent storage directory.

20 Claims, 8 Drawing Sheets

DURABLE ASYNCHRONOUS REPLICATION IN A DISTRIBUTED STORAGE SYSTEM

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. For example, object storage services may allow I/O at the level of individual objects or resources, such as individual files, which may vary in content and length. An object storage service may provide an interface compliant with the Representational State Transfer (REST) architectural style, such as by allowing I/O based on calls designating input data and a hypertext transport protocol request method (e.g., GET, PUT, POST, DELETE, etc.) to be applied to that data.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
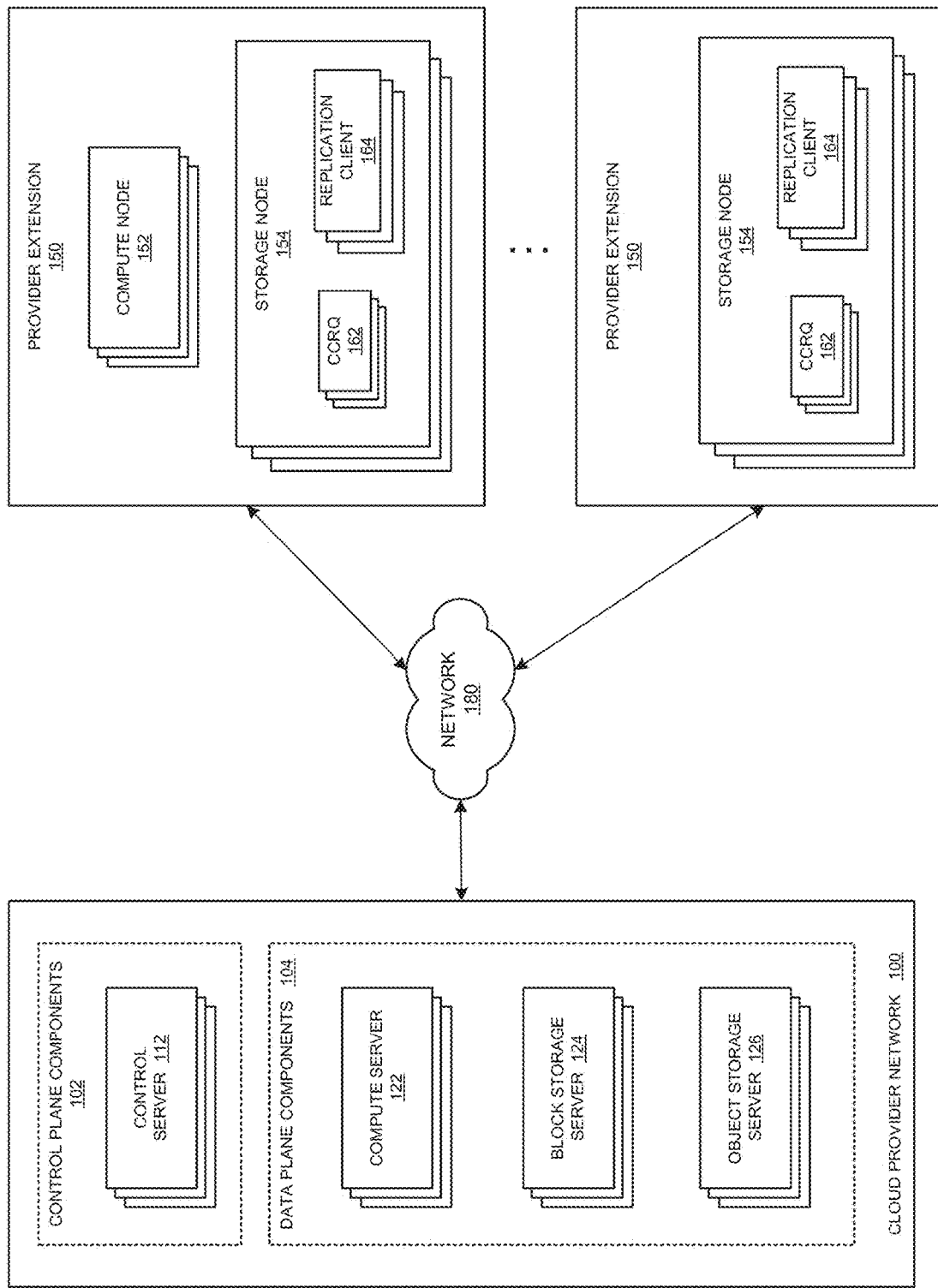
FIG. 1 is a block diagram depicting an illustrative environment in which a distributed storage system can store and replicate data objects according to some embodiments.

The present disclosure relates to managing replication of data objects and storage events in a distributed system in a manner that is crash-consistent, properly sequenced, and ensures eventual progress of replication tasks. Crash consistency is ensured in part through use of a transaction protocol and directory structure. The transaction protocol involves production of replication management metadata as part of an initial storage transaction to store a data object (or to perform a related storage action) that is to be replicated. An asynchronous replication task is managed using different file directories for storage of the replication management metadata as an indicator of the state of the replication task. Proper sequencing is provided through object metadata, assigned or coupled to the data object or replica object, that provides a single source of truth regarding replication status and sequencing of multiple replication tasks associated with the data object.

Some storage systems provide replication through a synchronous replication process in which a data object is stored and replicated as part of a storage transaction. However, in large distributed systems that replicate data objects across geographic locations, some network conditions between geographic locations can make rapidly committing transactions difficult, impractical, or impossible (e.g., when network bandwidth is completely consumed, when network links go down, etc.), and the resulting latency of storage operations can be unsatisfactory. Some storage systems provide replication as a background process to improve latency of original storage operations. However, such background replication typically relies on a replication service detecting or being notified of a storage event that triggers replication. Any disconnect between the original storage operation and notification to—or detection by—the background replication service can result in missed or otherwise unreliable replication. Moreover, crashes and other events that commonly occur in distributed systems can cause inconsistencies in replication tasks that are initiated by a background replication service.

Some aspects of the present disclosure address some or all of the issues noted above, among others, through a transaction protocol in which replication management metadata for a replication task—if one is to be performed—is generated and persistently stored as part of an atomic transaction in which the data object or data storage event subject to replication is persistently stored. In some embodiments, when a new data object is to be stored, when an existing data object or related data is to be modified (e.g., tags, such as key-value pairs, assigned to the data object are to be replaced), or when an existing data object is to be deleted, the system performing the storage operation can determine if the operation is subject to replication. If so, the system can generate and persistently store (e.g., as a file on a disk) replication management metadata as part of the same transaction as persistently storing the data object itself, persistently storing the related data, or deleting the object from persistent storage. Thus, there is no disconnect between data storage operations and the system responsible for replication: if the replication management data is not successfully generated and persistently stored, then the transaction is rolled back even if the data object or related data would be successfully and persistently stored, and vice versa. The replication task itself can be performed asynchronously (e.g., outside of the transaction), thereby improving the latency experienced by users initiating data storage operations. Moreover, because the replication management metadata is persistently stored, it remains available even after a crash or other event. Such transaction-generated and persistently stored replication management metadata for a particular data object or data storage operation may be referred to as a "crash consistent replication marker," or CCRM for brevity.

Additional aspects of the present disclosure relate to use of a file system directory structure, and to movement of a CCRM through different directories of the directory structure to persistently maintain the state of a replication task. Crash consistency of a CCRM throughout a replication task comes from persistent storage of the CCRM as a file (or set of files) in a file system directory that corresponds to the state of the replication task. Thus, if the storage node on which the CCRM is being used goes offline (e.g., crashes, gets rebooted, gets disconnected and later reconnects, etc.), any CCRMs being handled by the storage node will persist along with other data stored in persistent storage (e.g., on disk storage) of the storage node. When the storage node comes back online, each replication task may resume from the correct state based on the particular directory in which each corresponding CCRM is stored. In some embodiments, a directory structure may be used that includes a directory for CCRMs awaiting processing (e.g., an "awaiting" directory) and a directory for CCRMs that are in the process of being used for a replication task (e.g., a "replicating" directory). While being part of a persistent storage file system, these directories may be transient in the sense that the states they represent are to be temporary: all CCRMs are to eventually progress from awaiting through replicating an on to a finished state, even if the finished state corresponds to an unsuccessful finish. For example, the directory structure may include a directory for CCRMs for replication tasks that have completed successfully (e.g., a "completed" directory), and a directory for replication tasks that have failed (e.g., a "failed" directory). In some embodiments, the failed state may also be transient in that failed replication tasks are either to be retried or aborted. In such configurations, the CCRMs in the failed directory are to eventually move to a final directory for aborted replication tasks (e.g., an "aborted" directory) or back to the awaiting directory if the replication task is to be retried.

In some embodiments, the awaiting directory can serve as a replication queue to organize the order in which CCRMs—and therefore replication tasks—are processed. In this configuration, the awaiting directory may be referred to as a crash consistent replication queue, or CCRQ for brevity. For example, the CCRQ may be implemented as a first-in-first-out (FIFO) queue. The order of each CCRM in the CCRQ may be maintained by applying sequence identifiers to each CCRM. Sequence identifiers may be generated as unique, monotonically-changing sequence identifiers assigned when the CCRMs are generated or stored in the CCRQ. Thus, the order in which each CCRM is generated—which is based on the order in which the underlying data event to be replicated has occurred—may be maintained and referred to later, even when multiple replication clients dequeue CCRMs from the CCRQ and process them asynchronously, as described in greater detail below.

In some embodiments, there may be separate CCRQs—and therefore different directories—for different types of replication tasks. Different types of replication tasks may be defined by different replication rules that are attached to an object data store. For example, one type of replication task may be defined by a rule specifying that all new data objects are to be replicated to a particular set of one or more destinations remote from the source object data store. Each time a new data object is stored in the object data store, a set of one or more CCRMs may be generated (e.g., one for each of the one or more replication destinations), and the CCRM(s) may be placed in the CCRQ for the rule. Another type of replication task may be defined by a rule specifying that object tags are to be replicated when they are placed on an existing data object. Each time a set of one or more tags is placed on an existing data object, a set of one or more CCRMs may be generated (e.g., one for each replication destination that stores a replicated copy of the data object), and the CCRM(s) may be placed in a CCRQ different from the one for the new data object replication task type.

Further aspects of the present disclosure relate to use of object metadata as a single source of truth for replication tasks associated with a data object. The object metadata for a particular data object may include, among other things, data referred to as a "per object marker," or POM for brevity. In some embodiments, a POM may be used to track the status of any or all replication tasks associated with the data object to which the POM applies. For example, a particular data object may be the subject of multiple replication tasks, such as replication tasks to replicate the object to each of multiple destinations, replication tasks to add and replace tags assigned to the data object, a replication task to delete the data object, or any combination thereof. A POM may be coupled to or otherwise assigned to the data object, such as being integrated into the metadata that is stored with the data object itself.

On the source data store side of a distributed storage and replication system, the POM may be used to track each replication task and maintain the current status. Advantageously, because the POM is the single source of truth for replication tasks and status on the source data store side, the POM may be used to manage multi-node replication operations proceeding according to a quorum. For example, the POM may indicate that a particular replication task has completed successfully by a node of a source data storage cluster. Other nodes of the source data storage cluster may access the POM (e.g., after a reboot or disconnection) and, based on successful completion by another node, determine that their own replication task may be moved or "rolled" forward (e.g., to the completed directory) without further action.

On the destination side of a distributed storage and replication system, the POM may be used to track the sequence of certain data storage events that are sensitive to sequence. For example, multiple replication clients on the source data side may dequeue CCRMs from a CCRQ for processing. Due to latencies inherent in processing and network communication, a replication client that dequeued a CCRM added to a CCRQ after a prior CCRM for the same data object was added to the CCRQ (or added to a different CCRQ) may nevertheless execute a corresponding replication task before a replication client handling the replication task for the prior CCRM. Because each CCRM may be assigned a unique, monotonically-changing sequence identifier as described above, the correct order of execution may be enforced, or the same result may nevertheless be achieved as if the processing tasks were executed in the proper sequence. For example, when a replication task for a storage event is completed, the POM for the affected object on the destination side may be updated with the sequence identifier of the replication task. If subsequently a replication task is attempted with a sequence identifier preceding the sequence identifier stored in the POM, the destination node may safely ignore the replication task. Advantageously, using sequence identifiers in this manner can enforce idempotency by ensuring that certain versioned data (e.g., tags associated with an object) are only applied if they are more-recently saved on the source side than the last-applied tags on the destination side. Thus, if multiple nodes on the source side are managing CCRMs and some execute before others, the order of execution does not affect the last-stored data on the destination side.

Various aspects of the disclosure will now be described with regard to certain examples and embodiments, which are intended to illustrate but not limit the disclosure. Although aspects of some embodiments described in the disclosure will focus, for the purpose of illustration, on particular examples of network configurations, data storage architectures, data access protocols, and processing operations, the examples are illustrative only and are not intended to be limiting. In some embodiments, the techniques described herein may be applied to additional or alternative network configurations, data storage architectures, data access protocols, processing operations, and the like Overview of Example Computing Environment With reference to an illustrative embodiment, FIG. 1 shows an example computing environment in which the crash-consistent, linearizable, asynchronous replication features of the present disclosure may be implemented. As shown, the computing environment includes a cloud provider network 100 (also referred to herein as a "provider network," "cloud provider system", or simply as a "cloud" for convenience) and any number of provider extensions 150 (each of which may also be referred to as a "provider network extension" or simply as a "PNE" for convenience) that is a remote extension of the cloud provider network 100.

The cloud provider network 100 and the provider extensions 150 may communicate with each over via one or more communication networks 180. Illustratively, a network 180 may be a publicly-accessible network of linked networks, some or all of which may be operated by various distinct parties, for example the Internet. In some cases, a network 180 may include a private network, personal area network, local area network, wide area network, cellular data network, satellite network, etc., or some combination thereof, some or all of which may or may not have access to and/or from the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block storage servers 124 (which provide virtualized persistent block storage for designated compute instances). These virtual computing devices have attributes of a personal computing device including hardware (various types of processors, local memory, random access memory (RAM), hard-disk and/or solid state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block storage server 124, an object storage server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block storage servers 124, which can include persistent storage for storing volumes of customer data as well as software for managing these volumes. These block store servers can support a managed block storage service of the cloud provider network 100. The block storage servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object storage servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a provider extension 150—to be provisioned within the customer's network. A customer may access their provider extension 150 via the cloud provider network 100 or their own network, and may use the same APIs to create and manage resources in the provider extension 150 as they would use to create and manage resources in the cloud provider network 100 region.

The provider extension 150 may be pre-configured, e.g., by the provider network operator, with the appropriate combination of hardware with software and/or firmware elements to support various types of computing-related resources, and to do so in a manner that mirrors the experience of using the cloud provider network 100. For example, one or more compute nodes 152 can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their provider extension 150 as they do in the cloud provider network 100 region, a compute node 152 can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the compute node 152, meaning while other VMs are still running and consuming other capacity of the compute node 152. This can improve utilization of resources within the provider extension 150 by allowing for better packing of running instances on physical hosts, and also provides a seamless experience regarding instance usage across the cloud provider network 100 region and provider extension 150.

In some embodiments, compute nodes 152 can host one or more VMs. The customer can use these VMs to host containers, which package up code and all its dependencies so an application can run quickly and reliably from one computing environment to another. In addition, the compute nodes 152 may host one or more data volumes, if desired by the customer. In the cloud provider network 100 region, such volumes may be hosted on dedicated block storage servers 124. However, due to the possibility of having a significantly smaller capacity in the provider extension 150 than in the region, it may not provide an optimal utilization experience if the provider extension 150 includes such dedicated block store servers. Accordingly, the block storage service may be virtualized in the provider extension 150, such that one of the VMs runs the block store software and stores the data of the volume. Similar to the operation of the block storage service in the region, the volumes within a provider extension 150 may be replicated for durability and availability. The volumes may be provisioned within their own VPC within the provider extension 150. The VMs and any volumes collectively make up the data plane components within the provider extension 150 that are an extension of the provider network data plane 104.

The compute nodes 152 may, in some implementations, host certain local control plane components, for example components that enable the provider extension 150 to continue functioning if there is a break in the connection back to the cloud provider network 100 region. Examples of these components include a migration manager that can move VMs between provider extension servers if needed to maintain availability, a key value data store that indicates where volume replicas are located, and a local VM placement component that can respond to requests for new VMs made via the customer network. However, generally the control plane for the provider extension 150 will remain in the cloud provider network 100 region, in order to allow the customer to use as much capacity of the provider extension 150 as possible. At least some VMs that are set up at the provider extension 150, and associated higher-level services that use such VMs as building blocks, may continue to function even during periods of time when connectivity to the provider network data centers is temporarily disrupted in some embodiments.

A local gateway (not shown) can be implemented to provide network connectivity between resources running on the compute nodes 152 and customer devices on the customer's network, in order to take advantage of the reduced latency and other benefits of having cloud provider hardware installed in the customer network. The customer can establish communications between instances hosted by the provider extension 150 and the customer devices via the local gateway. The local customer devices can include any on-premise or mobile devices that have access to the customer network, for example robotic devices, manufacturing devices, medical equipment, mobile phones, or other computing devices on the customer network.

There may be circumstances that necessitate the transfer of data between the object storage service in the cloud provider network 100 and the provider extension 150. For example, the object storage service may store machine images used to launch VMs, as well as snapshots representing point-in-time backups of volumes. An object gateway can be a provider on a compute node 152 or a specialized storage device, and provides customers with configurable, per-bucket caching of object storage bucket contents in their provider extension 150 to minimize the impact of PNE-region latency on the customer's workloads.

In the manner described above, the provider extension 150 forms an edge location, in that it provides the resources and services of the cloud provider network 100 outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be a provider extension 150 that, as described above, serves as an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of provider extension 150—located outside of cloud provider network 100 data centers—can be referred to as an "outpost" of the cloud provider network 100. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

By way of illustration, the cloud provider network 100 and one or more provider extensions 150 may form a distributed storage system that enables clients to read, write, modify, and delete data objects or other data items, each of which represents a set of data associated with an identifier, such as an object key (also referred to simply as a key). Individual data objects may be interacted with as individual resources. For example, an object may represent a single file submitted by a client device (though the distributed storage system may or may not store such an object as a single file). This object-level interaction can be contrasted with other types of storage services, such as block-based storage services providing data manipulation at the level of individual blocks or database storage services providing data manipulation at the level of tables (or parts thereof) or the like.

The distributed storage system may provide an interface (a command-line interface (CLI), application programing interface (API), or another programmatic interface). For example, a client device (e.g., a device in the cloud provider network 100, in a provider extension 150, connected to a customer on-premise network, or connected to any of these systems via network 180) may create a collection of data objects stored in storage nodes and/or on object storage servers. Client devices may thereafter create, read, update, or delete objects within the collection. In one embodiment, the distributed storage system provides a REST-compliant HTTP interface supporting a variety of request methods, each of which corresponds to a requested I/O operation. By way of non-limiting example, request methods may include:

- a GET operation requesting retrieval of an object by reference to an identifier of the object;
- a PUT operation requesting storage of an object, including an identifier of the object and input data to be stored as the object;
- a DELETE operation requesting deletion of an object by reference to an identifier of the object; and
- a LIST operation requesting listing of objects within an object collection by reference to an identifier of the collection.

With reference to an illustrative example, a provider extension 150 may be configured to obtain a call to a request method, and apply that request method to input data for the method. For example, the provider extension 150 can respond to a request to PUT input data as an object by storing that input data as the object. Objects may be stored, for example, in one or more of the provider extension's 150 storage nodes 154, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, provider extension 150 can respond to a request to GET an object by retrieving the object from a storage node 154 (the object representing input data to the GET resource request), and returning the object to a requesting client device.

In some embodiments, the data store(s) provided by the provider extension(s) 150 and/or cloud provider network 100 for storing objects act to provide an immutable data store. For example, when a data object is stored at a particular location (e.g., at a provider extension 150), only that data object, with the data value(s) assigned to the data object at the time of storage, will be stored at that particular location. When a change is made to the data object, the changed data object is stored at a new storage location. Thus, the mapping of the object key to storage location may change each time the data object itself is changed. To provide disaster recovery or other backup services, data objects stored in one provider extension 150 may be replicated to another provider extension 150 or region of the provider network, as described in greater detail below.

Consistency Verification

Figure 2:
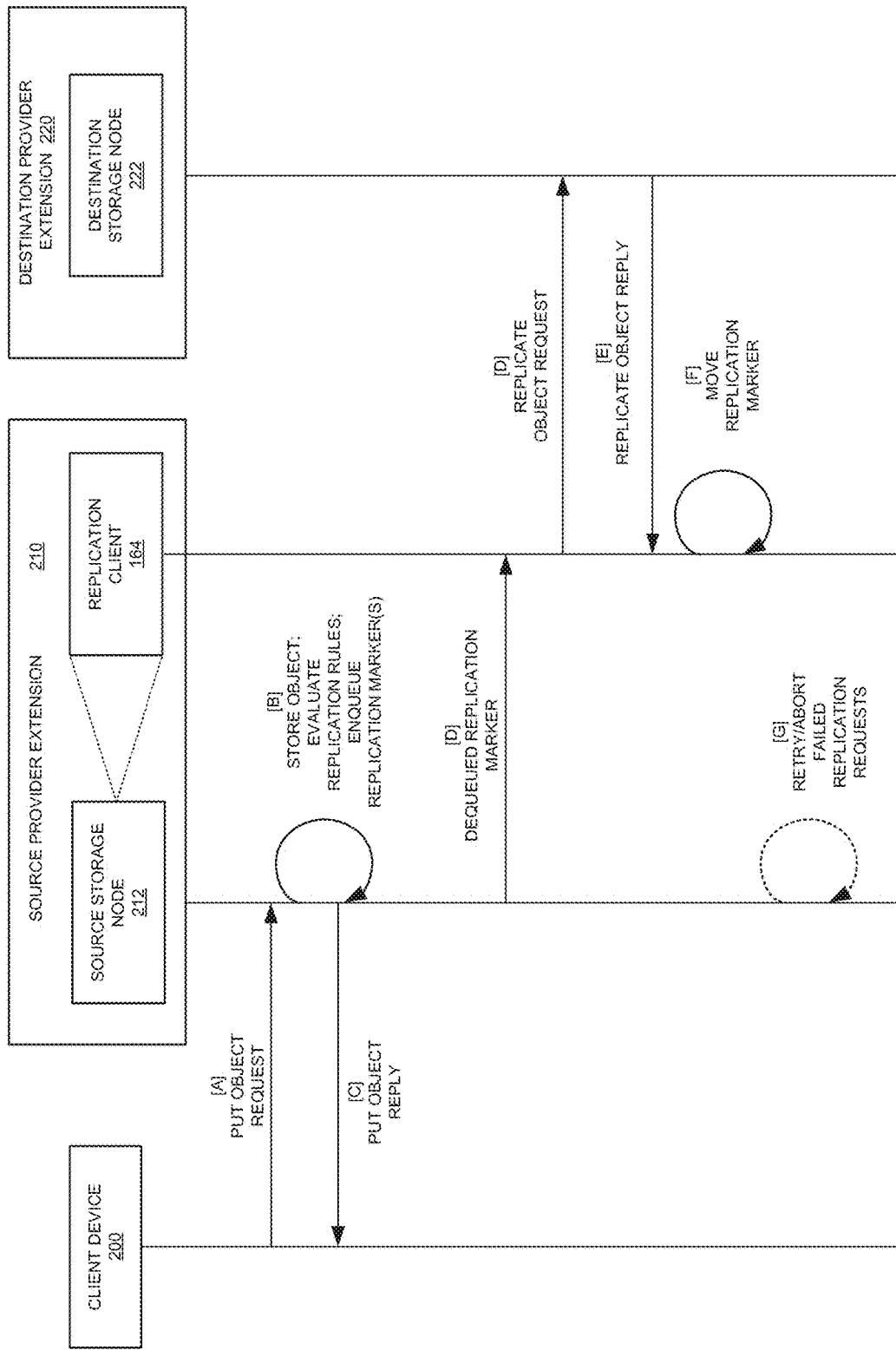
FIG. 2 illustrates data flows and interactions between a client device, a source provider extension, and a destination provider extension during the storage and asynchronous replication of a data object according to some embodiments.

FIG. 2 illustrates example data flows and interactions between a client device and various provider extensions to initiate a data storage event and replicate the effect of that event across provider extensions. The client device 200 may be a device in the cloud provider network 100, in a provider extension 150, connected to a customer on-premise network, or connected to any of these systems via network 180. The provider extension 150 that is to store the source data object and serve as the source of a replication task will be referred to as a source provider extension 210. The provider extension 150 that is to store the replica of the data object and serve as the destination of the replication task will be referred to as a destination provider extension 220.

While some example data storage and replication tasks are described herein in the context of a single source provider extension 210 and a single destination provider extension 220, the examples are provided for purposes of illustration only, and are not intended to be limiting, required, or exhaustive. In some embodiments, the source data store and source of a replication operation may be the cloud provider network 100. In some embodiments, the replica data store and destination of a replication operation may be the cloud provider network. In some embodiments, there may be multiple replication destinations, including any number of provider extensions 150, the cloud provider network 100, or a combination thereof.

With reference to an illustrative embodiment, at [A] the client device 200 may issue a request to the source provider extension 210 that triggers a data storage event. For example, the client device 200 may issue a PUT request to store a new data object, or to store a new set of one or more tags (e.g., key-value or name-value pairs) with an existing data object.

At [B], the source provider extension 210 may execute an atomic transaction in which the source provider extension 210 stores input data that is the subject of the PUT request (e.g., a new data object, or tags for an existing data object), and also generates replication metadata for any replication tasks that are to be triggered by storage of the data. The determination of whether one or more replication tasks are to be executed may be based on a replication configuration of the storage location for the input data.

In some embodiments, the storage location of the input data (e.g., an object bucket) may be assigned one or more replication rules. For example, a replication rule may specify that any new objects stored in a particular bucket are to be replicated to a particular set of destination provider extensions, including destination provider extension 220. As another example, a replication rule may specify that any new tags applied on objects in the bucket are to be replicated to a particular set of destination provider extensions, including destination provider extension 220. The example replication rules described herein are illustrative only, and are not intended to be limiting, required, or exhaustive. In some embodiments, additional, fewer, or alternative replication rules may be defined.

As part of the transaction to store the input data or otherwise effect the requested storage operation, the source provider extension 210 may evaluate the replication rules associated with the bucket, and generate CCRMs for any replication tasks specified by the replication rules. The CCRMs may be generated as files in a staging area (e.g., a "staging" directory of a file system). Once all of the CCRMs have been generated, they may be moved to the appropriate CCRQ.

The transaction initiated by the PUT request may be committed if and only if the input data is successfully stored in the bucket, and any CCRMs are successfully moved to their respective CCRQs. If either of those operations fail, then the transaction may be rolled back and the state of persistent storage of the source provider extension 210—at least as it relates to the affected data object—is returned to the state prior to receiving the PUT request. If both operations complete successfully and the transaction is committed, a reply may be sent to the client device 200 at [C].

At [D], the source provider extension 210 or a particular component thereof, such as a replication client 164, may dequeue a CCRM generated as described above. An example routine that may be executed by a replication client 164 to dequeue and process a CCRM is described in greater detail below.

In some embodiments, dequeuing a CCRM may involve moving the CCRM to a different directory of the file system (e.g., to an "awaiting" directory). In this way, the CCRM is not lost if there is a system outage before the replication task indicated by the CCRM is completed; the CCRM may be accessed at the awaiting directory once the system outage is resolved. An example of generating a CCRM and moving it through different file system directories corresponding to different states of the replication task is described in greater detail below.

At [D] the replication client 164 may request replication of the input data to the destination provider extension 220 indicated by the CCRM. The replication client 164 may receive a reply from the destination provider extension 220 at [E]. The reply may indicate success or failure of the replication operation. For example, the destination provider extension 220 may execute an atomic transaction to store the data on a destination storage node 222. The reply from the destination provider extension 220 may indicate the result of the transaction.

At [F], the replication client 164 may move the CCRM to another directory depending upon the result of the replication request. For example, if the replication request was processed successfully, then the replication client 164 may move the CCRM to a "completed" directory to indicate the completed status of the request. As another example, if the replication request was not processed successfully, then the replication client 164 may move the CCRM to a "failed" directory to indicate the failed status of the request.

In some embodiments, the replication client 164 may determine whether to retry or abort a failed replication request at [G]. For example, if the failure was due to a lack of storage capacity or processing capacity at the destination provider extension 220, then the replication task may be paused for a period of time until sufficient capacity is available at the destination provider extension 220. To avoid repeated failed retry attempts and to avoid a retry causing future failures, a hysteresis-based algorithm may be used to back off a retry until the storage capacity or processing capacity at the destination provider extension 220 returns to a level that is greater than what is required to successfully complete the replication task. When the replication task is to be retried, the replication client 164 may move the CCRM back into the CCRQ (e.g., re-enqueue the CCRM).

If a failure is not retriable, then the replication task may be aborted. For example, a replication task may be retried a maximum number of times before it is aborted. As another example, certain causes of failures may result in aborting the replication tasks without any retry. When the replication task is to be aborted, the replication client 164 may move the CCRM into an "aborted" directory to indicate the aborted status of the request.

Although FIG. 2 illustrates the source provider extension 210 including a single source storage node 212 having a single replication client 164, and a single destination provider extension 220 with a single destination storage node 222, the example is provided for ease of illustration only, and is not intended to be limiting, required, or exhaustive.

In some embodiments, a source provider extension 210 may have any number of source storage nodes 212, and each source storage node 212 may maintain any number of replication clients 164. For example, a source provider extension 210 may have four storage nodes that operate according to read and write quorums to provide performance and redundancy within the source provider extension 210. Each source storage node 212 may maintain a pool of replication clients (e.g., 100 replication clients 164) that monitor the CCRQs of the source storage node 212 and deque and process the CCRMs in the order in which they are queued. However, because each replication client 164 may operate on a single CCRM at a time, some CCRMs that are dequeued after previously dequeued CCRMs may nevertheless be executed before the previously dequeued CCRMs due to being processed by different replication clients 164 (e.g., a replication client 164 may crash, some CCRMs take less time to execute, etc.). To ensure that replication tasks that are sensitive to the sequence in which they are queued are not executed out of order, a data object to which the replication tasks apply may be assigned or may include metadata, referred to as a POM. The POM may serve as a single source of truth for object replication status across the source provider extension 210. Examples of using a POM in this way are described in greater detail below.

In some embodiments, a destination provider extension 220 may have any number of destination storage nodes 222. For example, a destination provider extension 220 may have four storage nodes that operate according to read and write quorums to provide performance and redundancy within the destination provider extension 220. To ensure that replication tasks that are sensitive to the sequence in which they are queued are not executed out of order, a data object to which the replication tasks apply may be assigned or may include metadata, referred to as a POM. Like the POM on the source provider extension 210, the POM on the destination provider extension 220 may serve as a single source of truth for object replication status across the destination provider extension 220. Advantageously, a POM for a particular object on the destination provider extension 220 may store sequence data regarding the latest sequence identifier for a replication task that has been executed for the data object. Thus, if a replication task associated with an earlier sequence identifier is attempted, the destination provider extension 220 can safely ignore the replication task, but may still return a successful reply to the source provider extension 210. Examples of using a POM in this way are described in greater detail below.

In some embodiments, a single request (e.g., a single PUT object request) may result in multiple CCRMs being generated, such as a separate CCRM for replication to each of a plurality of destination provider extensions 220.

Although the destination storage node 222 is named as such and is not shown as including a replication client 164, the example is provided for purposes of illustration only and is not intended to be limiting. In some embodiments, the destination storage node 222 may also execute one or more replication clients 164, and may replicate data storage operations to other nodes, including the source storage node 212. For example, a set of tags for an object replicated to the destination storage node 222 from the source storage node 212 may be replaced on the destination storage node 222 by a user or automated process. The tag replacement may be replicated to the source storage node 212 and/or other storage nodes using the replication task processes described herein.

Recovery Marker Processing

Figure 3:
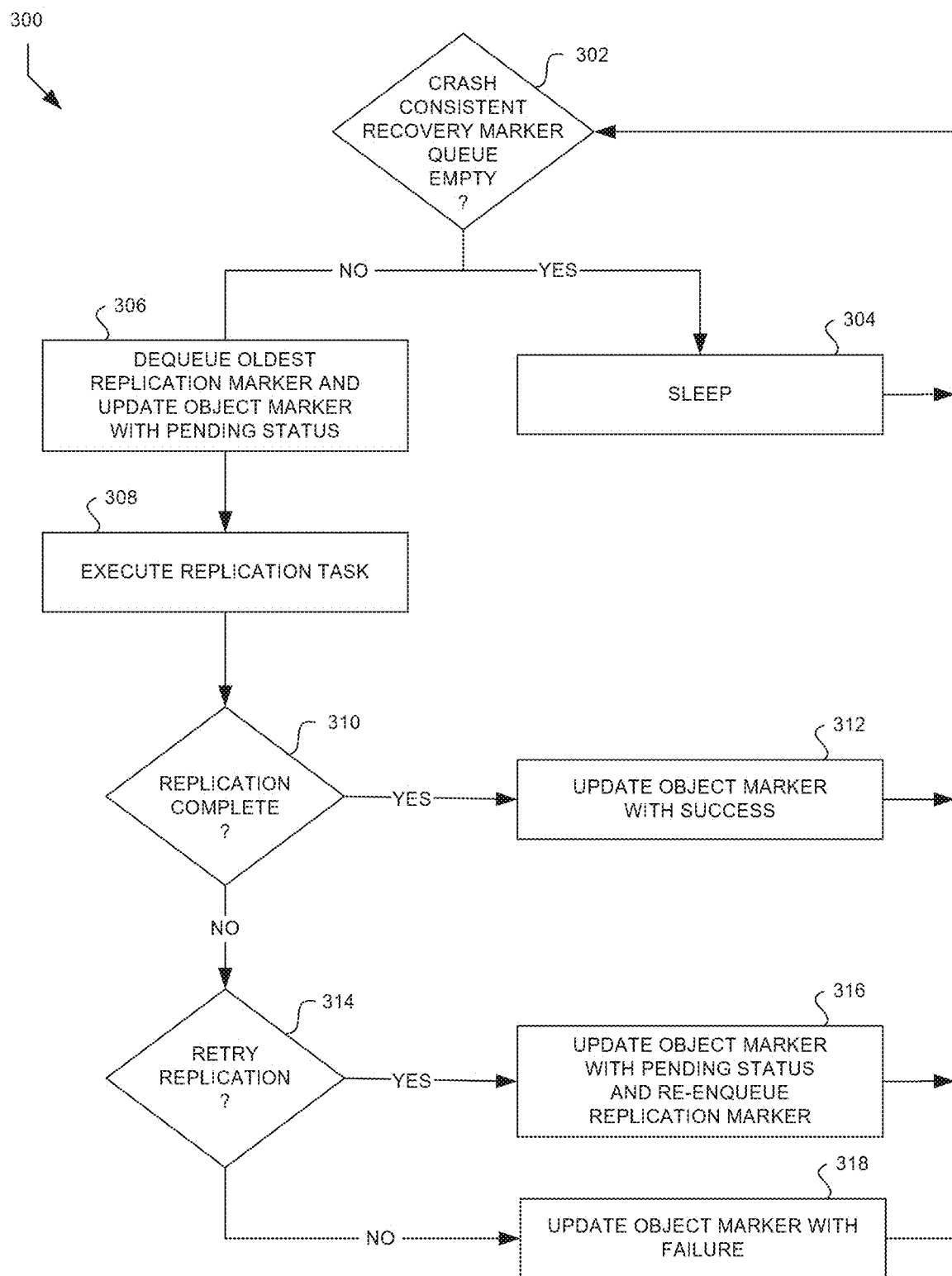
FIG. 3 is a flow diagram of an illustrative routine for monitoring a crash consistent replication queue and processing crash consistent replication markers according to some embodiments.

FIG. 3 is a flow diagram of an illustrative routine 300 that may be executed by a replication client 164 to monitor a CCRQ 162 and process CCRMs. Aspects of the routine 300 will be described with further reference to the illustrative data flows and interactions shown in FIG. 4.

The routine 300 may begin in response to an event, such as when a source storage node 212 begins operation or adds a replication client 164 to a pool of replication clients. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 300 or portions thereof may be implemented on multiple processors, serially or in parallel.

At decision block 302, a replication client 164 may determine whether a CCRQ 162 is empty. If so, the replication client 164 may sleep at block 304 for a predetermined or dynamically determined period of time (e.g., 10 milliseconds, 100 milliseconds, 1 second, etc.) before checking the CCRQ 162 again. If the CCRQ 162 is not empty, the routine 300 may proceed to block 306.

In some embodiments, a replication client 164 may monitor a single CCRQ 162 out of multiple CCRQs implemented on a source storage node 212. For example, data objects may be organized into different buckets (e.g., a separate bucket for each customer account, a separate bucket for each top-level group defined by a particular customer account, etc.). Each bucket of data objects stored on the source storage node 212 may be associated with its own CCRQ 162. As another example, each replication rule defined for a particular bucket may be associated with its own CCRQ 162.

In some embodiments, a replication client 164 may monitor any or all CCRQs implemented on a source storage node 212. For example, the replication client 164 may use a round robin or randomized selection algorithm to check different CCRQs after determining that a particular CCRQ is empty.

At block 306, the replication client 164 may dequeue from the CCRQ 162 a CCRM to be processed. In some embodiments, the replication client 164 may also update metadata for the data object that is the subject of the replication task to indicate pending status of the replication task.

Figure 4:
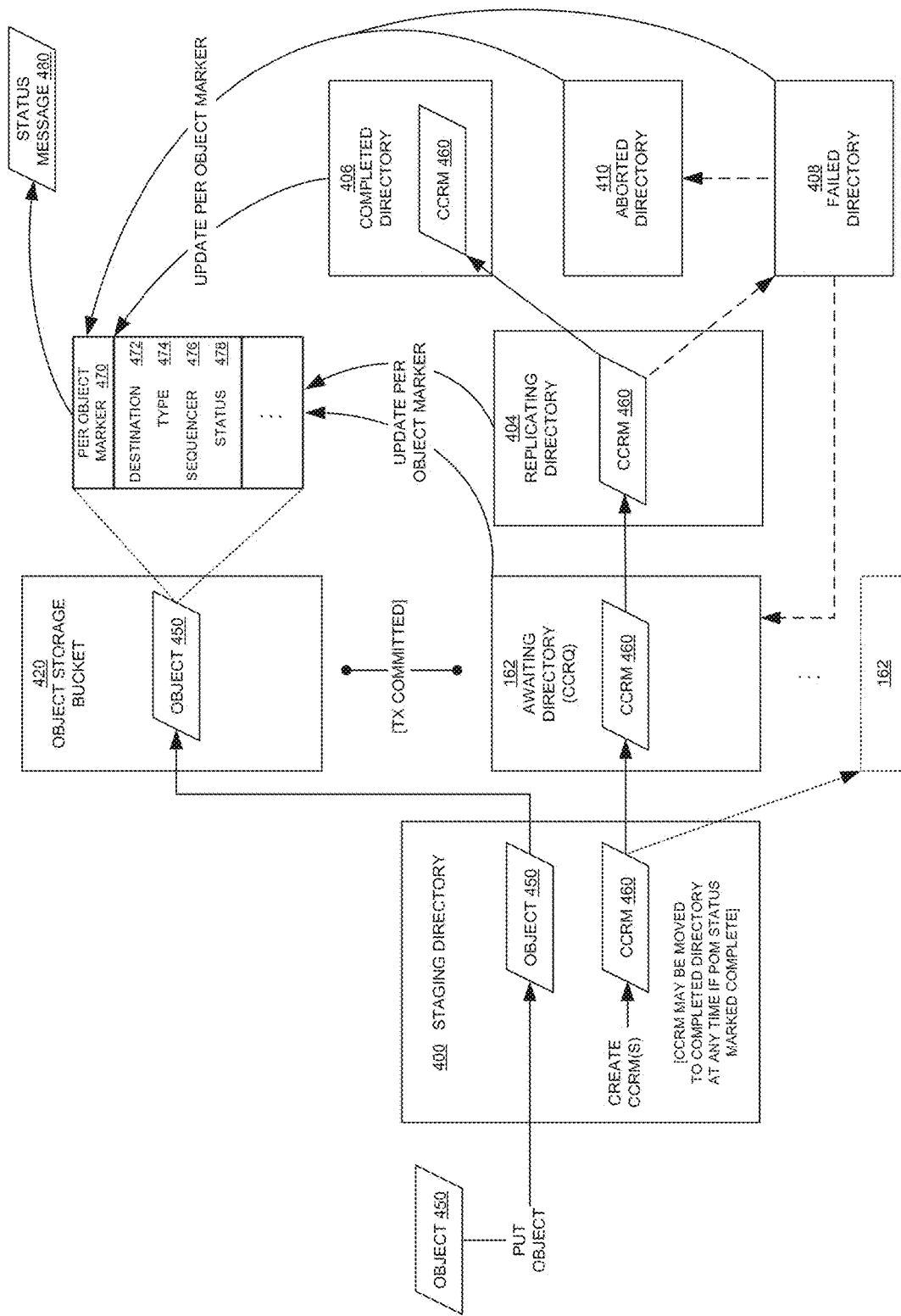
FIG. 4 is a diagram of data flows and interactions within a source storage node during storage and asynchronous replication of a data object according to some embodiments.

FIG. 4 illustrates an example in which a CCRM 460 is generated in connection with a PUT event for a data object 450. In some embodiments, as shown, the object 450 may be initially received in a staging directory 400 of the file system of a source storage node 212. Any replication rules for the object storage bucket 420 into which the object 450 is to be stored may be evaluated. If any replication tasks are to be performed based on the replication rule(s), then a CCRM 460 may be created for each replication task. The CCRM 460 may initially be created in the staging directory 400 as one or more files that specify the replication task to be performed.

In some embodiments, the CCRM 460 may include a manifest file that describes the replication task to be performed. For example, the manifest file may identify: the type of replication task to be performed (e.g., PUT object, PUT tag data, DELETE object); the replication rule under which the replication task is being performed; the destination provider extension 220 to which a data object or other data storage event is to be replicated; the destination bucket; encryption information for encrypting the data object; metrics under which the replication task is to be performed; other data; or any combination thereof. The manifest may be immutable throughout the CCRM's lifecycle to ensure that the replication task's parameters are not tampered with or corrupted.

In some embodiments, the CCRM 460 may include a snapshot of the data object to be replicated. To conserve storage space on the source storage node 212, the snapshot may be a hard link to the data object to be replicated (e.g., the data object in the bucket) rather than a duplicate of the data object. Generally described, a hard link is a file system construct that preserves the data object in unaltered form as long as a hard link is held (e.g., as long as the hard link in the CCRM remains), allowing the replication client 164 to access the data object and ensure that it is accessing the exact data object that triggered the replication request. For example, a data object for which a hard link is being held will not be removed; the file system maintains the data object on disk until all hard links have been released.

In some embodiments, the CCRM 460 may include a status file to track details of the replication status. For example, the status file may track the number of attempts that have been made to execute the replication task, errors encountered, a timestamp of the last update, other information, or some combination thereof. Advantageously, using a status file that is separate from the manifest file and hard link allows the manifest file and hard link to be immutable throughout the replication process, while permitting accurate status to be maintained within the status file.

Once the CCRM 460 has been created in the staging directory 400, it may be queued to the CCRQ 162 by moving it to a corresponding awaiting directory. In the description that follows, the terms CCRQ 162 and awaiting directory may be used interchangeably. However, it will be understood that the awaiting directory is merely one implementation of a CCRQ 162.

The CCRQ 162 may be a FIFO queue. To implement the CCRQ using a file system directory like the awaiting directory, a mechanism to maintain a sequence of CCRMs within the CCRQ 162 may be used. In some embodiments, if each CCRM 460 is created as a set of one or more files, then a unique, monotonically-changing sequence identifier may be assigned to the CCRM files within the awaiting directory (e.g., prepended or appended to the file names; added as file metadata, etc.). Owing to its properties of being unique and monotonically-changing (always and only changing in one direct to a next value in a sequence, whether the single direction is increasing or decreasing), the sequence identifier can be used to selected the oldest/least-recently queued CCRM from the CCRQ 162 for processing. Moreover, the unique monotonically-changing sequence identifier may be used in subsequent steps of the replication task to ensure that more-recently received data is not overwritten by less-recently received data. The unique, monotonically-changing sequence identifier may also be referred to as a "sequencer" for brevity.

In some embodiments, as shown in FIG. 4, the transaction under which the object 450 is successfully stored in the source storage node 212 may be committed at the point where the object 450 is written to the object storage bucket 420 where it is to be stored, and any CCRMs 460 for triggered replication tasks have been written to their corresponding CCRQs.

To dequeue a CCRM 460, the replication client 164 may move the CCRM 460 (e.g., move the files that make up the CCRM 460) from the CCRQ 162 (e.g., from the awaiting directory) to the replicating directory 404. In some embodiments, when the replication client 164 dequeues a CCRM, it may also update a replication status in the POM 470 associated with data object 450. Illustratively, the POM 470 may be metadata that is stored with the object 450 or otherwise inextricably assigned to as-stored data object 450 in the object storage bucket 420. The POM may include, for each replication task being performed based on the data object 450, one or more fields or other entries for tracking the status of the replication task. For example, the POM 470 may include: a destination entry 472 indicating the destination provider extension 220 for the replication task; a type entry 474 indicating the type of replication task being performed (e.g., PUT object, PUT tags, DELETE object); a sequencer entry 476 for the sequencer assigned to replication task via the CCRM; a status entry 478 to track the status of the replication task; other entries; or some combination thereof. For an object 450 that has been the subject of multiple replication tasks (e.g., replication to different destinations, replication of different types of data events over the lifecycle of the object, etc.), the POM 470 may include a different set of such entries for each replication task. To update the status on the POM 470 upon dequeuing the CCRM 460, the replication client 164 may set a value of "replicating" to the status entry 478 for the current replication task.

Returning to FIG. 3, at block 308 of routine 300 the replication client 164 may execute the replication task specified in the CCRM. To execute the replication task, the replication client 164 may evaluate the CCRM (e.g., the manifest file) to determine the specific details of the replication task (e.g., destination, type of replication task, etc.). The replication client 164 may then use hard link to the data object 450 to access the data object and obtain any needed data (e.g., the data object, tags applied to the object, etc.). The replication client 164 may then request that the indicated destination provider extension 220 execute the replication task to store the provided data or otherwise implement a data event to be replicated. Execution of a replication task by a destination provider extension 220 is described in greater detail below.

At decision block 310, the replication client 164 may determine whether replication has completed successfully. In some embodiments, the determination may be based on a reply from the destination provider extension 220. If data was stored successfully (or safely ignored by the destination provider extension 220), then the reply may indicate successful completion, the replication client 164 may move the CCRM 460 into the "completed" directory 406, and the routine 300 may proceed to block 312. If data was not stored successfully, then the reply may indicate the failure. The replication client 164 may move the CCRM 460 into the "failed" directory 408, and the routine 300 may proceed to block 314. Example causes of failures may include, but are not limited to, a lack of sufficient storage capacity, a lack of processing capacity, or an error accessing the affected data object.

At block 312, the replication client 164 may update the POM for the data object to indicate success of the replication task. As shown in FIG. 4, POM may include a status entry 478. The status entry 478 may have been set to "replicating" at the beginning of replication task execution (e.g., when the CCRM 460 is copied into the replicating directory 404). The replication client 164 may change the value of the status entry 478 to "completed."

At decision block 314, the replication client 164 may determine whether to retry a failed replication task. In some embodiments, a failed replication task may be retriable if the failure is of a certain type (e.g., a failure to connect, a lack of storage capacity, a lack of processing capacity, etc.). In some embodiments, failed replication tasks are retriable up to a maximum number of times, after a waiting period, or based on some other configuration. For example, the status file of the CCRM 460 may indicate the number times the replication task has been tried. If the failed replication task is to be retried, the routine 300 may proceed to block 316. At block 316, the replication client 164 may update the POM 470 for the data object to indicate a pending status of the replication task (e.g., by updating the status entry 478), and re-enqueue the CCRM 460 (e.g., by returning the CCRM 460 to the CCRQ 162).

If a failure is not retriable, then the replication task may be aborted. For example, a replication task may be retried a maximum number of times before it is aborted. As another example, certain causes of failures may result in aborting the replication tasks without any retry. If the failed replication task is to be aborted, the routine 300 may proceed to block 318. At block 318, the replication client 164 may update the POM 470 for the data object to indicate that the replication task has been aborted (e.g., by updating the status entry 478). When the replication task is to be aborted, the replication client 164 may move the CCRM 460 into an "aborted" directory 410 to indicate the aborted status of the request.

A status message 480 may be generated based on the status of replication tasks as recorded in the POM 270. The status message 480 may be provided automatically (e.g., when a change in status recorded in the POM 270 occurs) or on demand (e.g., in response to a request from a user). In some embodiments, the status message 480 may be based on multiple status records in the POM 270. For example, an object 450 may be the subject of multiple replication tasks (e.g., replication to different destinations), and the POM 470 may include a different set of entries for each replication task. In this case, the status message 480 may only indicate successful replication if each replication task (e.g., replication to each different destination) has been marked as completed in the POM 470; otherwise, the status message 480 may indicate pending. In some embodiments, if any single replication task has been aborted, the status message 480 may indicate that replication has failed.

In some embodiments, the CCRM 460 may be moved forward (e.g., into the completed directory 406) if it is determined that the POM 470 indicates the replication task has already been completed successfully (e.g., by another source storage node 212). For example, a source storage node 212 (or a replication client 164 executing on a source storage node 212) may crash or experience another interruption during a replication task. When execution resumes, the replication client 164 can check the persistent storage directories and determine the current state of any CCRMs 460 stored therein. The replication client 164 may also check the POM 470 for the data object 450 that is the subject of a particular CCRM 460 to determine whether to proceed with the replication task or roll forward to completion. If the status entry 476 for the replication task corresponding to the CCRM 460 indicates the replication task has been completed successfully, the replication client 164 may move the CCRM 460 to the completed directory 406.

Using POM to Track Replication Task Status

Figure 5:
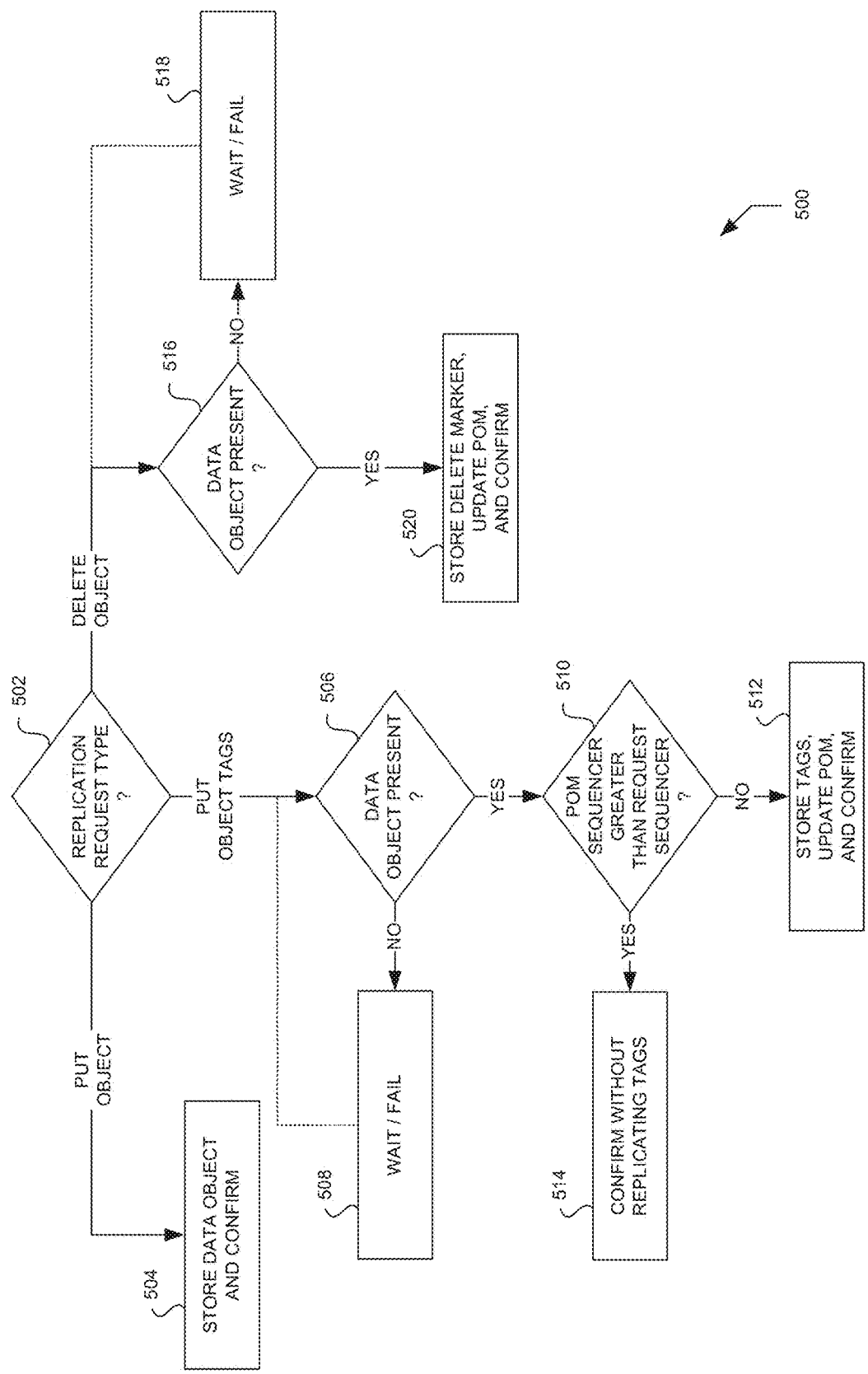
FIG. 5 is a flow diagram of an illustrative routine for managing replication tasks using per object markers according to some embodiments.

FIG. 5 is a flow diagram of an illustrative routine 500 that may be executed by a destination storage node 222 or some other replication destination for replication of data objects and storage events from a source storage node 212 or some other source of data objects and storage events. Advantageously, the destination storage node 222 may use the POM of the data object that is the subject of a replication task to track replication task status, ensure that replication tasks are not executed out-of-sequence, and ensure idempotency and linearization. Aspects of the routine 500 will be described with further reference to the illustrative replication task flows shown in FIGS. 6 and 7.

The routine 500 may begin in response to an event, such as when a destination storage node 222 begins operation or receives a request from a replication client 164 to execute a replication task. When the routine 500 is initiated, a set of executable program instructions stored on one or more non-transitory computer-readable media (e.g., hard drive, flash memory, removable media, etc.) may be loaded into memory (e.g., random access memory or "RAM") of a computing device and executed by one or more processors. In some embodiments, the routine 500 or portions thereof may be implemented on multiple processors, serially or in parallel.

At decision block 502, a destination storage node 222 may determine whether a requested replication task is a request to add a new data object (e.g., a PutObject request), a request to add a new set of tags to an existing data object (e.g., a PutObjectTag request), or a request to delete an existing data object (e.g., a DeleteObject request). Depending upon the request type, the routine may proceed to one of blocks 504, 506, or 516.

At block 504, in response to determining that the requested replication task is a request to add a new data object replica (e.g., a PutObject request), the destination storage node 222 can store the data object replica in the appropriate location (e.g., in a bucket identified in the request or determined by the destination storage node 222 based on the context of the request). Advantageously, storage of the data object replica may include generating or updating a POM that may be used to manage subsequent replication tasks affecting the data object replica.

Figure 6:
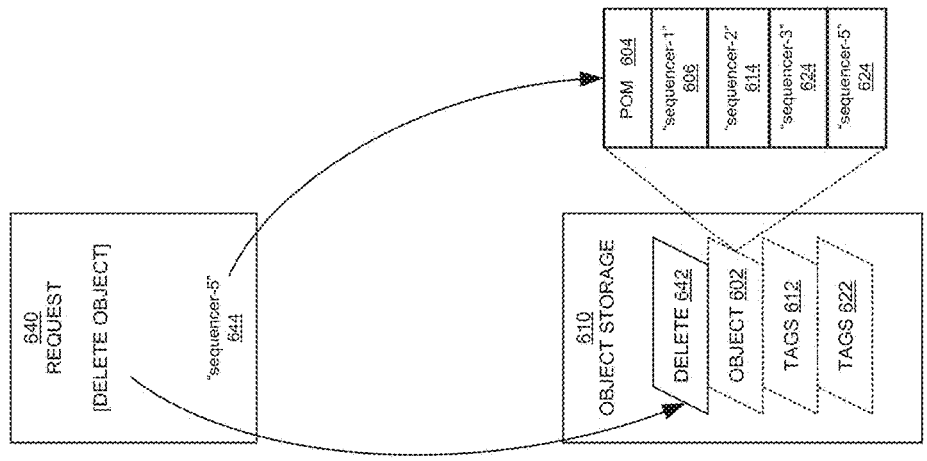
FIG. 6 is a diagram of data flows and interactions within a destination storage node during replication of a data object and related data using a per object marker according to some embodiments.
Figure 6:
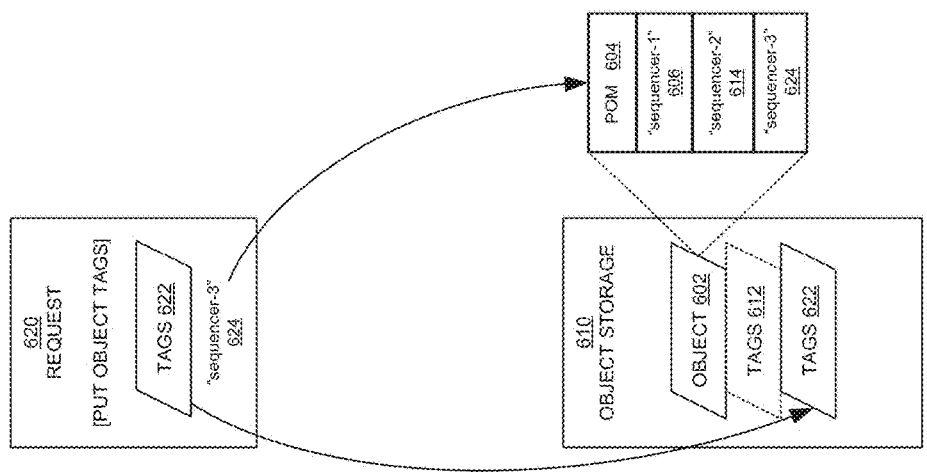
Figure 6:
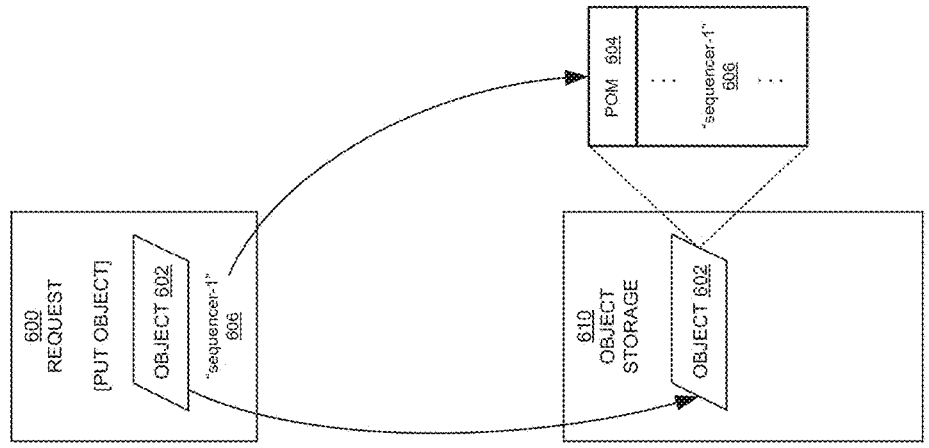

FIG. 6 illustrates at [A] an example of handling a request 600 to store a new data object replica 602. The data object replica 602 is stored in a data storage bucket 610, with POM 604 indicating a value for the sequencer entry 606 of "sequencer-1."

At decision block 506, in response to determining that the requested replication task is a request to add a new tag (or set of tags) to an existing data object replica (e.g., a PutObjectTag request), the destination storage node 222 can determine whether the data object replica to which the replication request applies is present on the destination storage node 222. For example, the destination storage node 222 can access the bucket in which the data object replica is to be stored, and determine whether the data object replica is present. If the data object replica is not present, the routine 500 may proceed to block 508, where the replication task is put on hold for a period of time before checking again to see if the object is present (e.g., based on out-of-order execution of a PutObject replication task by a different replication client 164). In some embodiments, if the data object replica is not present, at block 508 the destination storage node 222 can end the attempt to perform the replication task and return a failure reply to the replication client 164.

At decision block 510, in response determining that the data object replica is present, the destination storage node 222 may determine whether the latest sequencer in the POM for the affected data object replica is after (in the monotonically-changing sequence) than the sequencer for the current operation. This may be done to avoid out-of-order execution of certain replication tasks, such as replication tasks to replace object tags with a new set of object tags. For example, if a customer-initiated addition of two separate sets of tags to a data object at the source provider extension 210 at two different but closely-occurring points in time, and each new set of tags is meant to completely overwrite any existing set of tags for an object, then out-of-order execution of PutObjectTag requests would result in incorrect replication at the destination storage node 222. To avoid such incorrect replication, the unique monotonically-changing sequencers applied to each replication task can be used to ensure proper sequencing.

At block 512, in response to determining that the sequencer for the current operation is after the latest sequencer in the POM for the data object replica, the destination storage node 222 can store the tags with the object and update the POM to reflect the latest sequencer that has been completed.

FIG. 6 illustrates at [B] an example of handling a request 620 to store a new set of tags 622 for data object replica 602. The request 620 and tags 622 are associated with a sequencer 624 of "sequencer-3". The POM 604 for the data object replica 602 indicates a most-recent sequencer of "sequencer-2" 614 for a completed replication task. In this scenario, the destination storage node 222 can determine that the sequencer associated with the request is indeed after the most-recent sequencer for the data object replica 602. In response, the destination storage node 222 can apply the tags 622 to the data object replica 602, replacing a previously-applied set of tags 612. In the illustration, the replacement operation is indicated by dotted lines around previously-applied set of tags 612. In addition, the destination storage node 222 can add the new sequencer "sequencer-3" (and in some embodiments other information) to the POM 604 for the affected data object replica 602.

At decision block 516, in response to determining that the requested replication task is a request to delete an existing data object replica (e.g., a DeleteObject request), the destination storage node 222 can determine whether the data object replica to which the replication request applies is present on the destination storage node 222. For example, the destination storage node 222 can access the bucket in which the data object replica is to be stored, and determine whether it is present. If the data object replica is not present, the routine 500 may proceed to block 518, where the replication task is put on hold for a period of time before checking again to see if the object is present (e.g., based on out-of-order execution of a PutObject replication task by a different replication client 164). In some embodiments, if the data object replica is not present, at block 518 the destination storage node 222 can end the attempt to perform the replication task and return a failure reply to the replication client 164.

At block 520, in response to determining that the data object replica to which the DeleteObject request applies is present, the destination storage node 222 can store a delete marker with the object and update the POM to reflect the latest sequencer that has been completed. In some embodiments, data object replicas may be immutable and maintained even if deleted from a source provider network extension 210. To indicate the deletion and act as a barrier on the destination provider extension 220, the delete marker may be used.

FIG. 6 illustrates at [C] an example of handling a request 640 to execute a deletion replication task for data object replica 602. The request 640 is associated with a sequencer 644 of "sequencer-5". In response, the destination storage node 222 can store a deletion marker 642 with the data object replica 602. The POM 604 for the data object replica 602 indicates a most-recent sequencer of "sequencer-3" for a completed replication task. The destination storage node 222 can add the new sequencer "sequencer-5" (and in some embodiments other information) to the POM 604.

Figure 7:
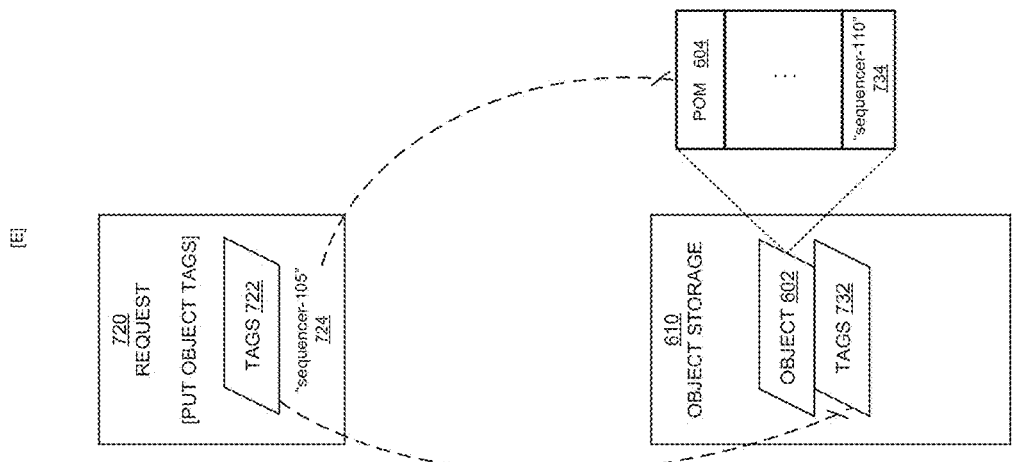
FIG. 7 is a diagram of data flows and interactions within a destination storage node during replication of a data object and related data using a per object marker according to some embodiments.
Figure 7:
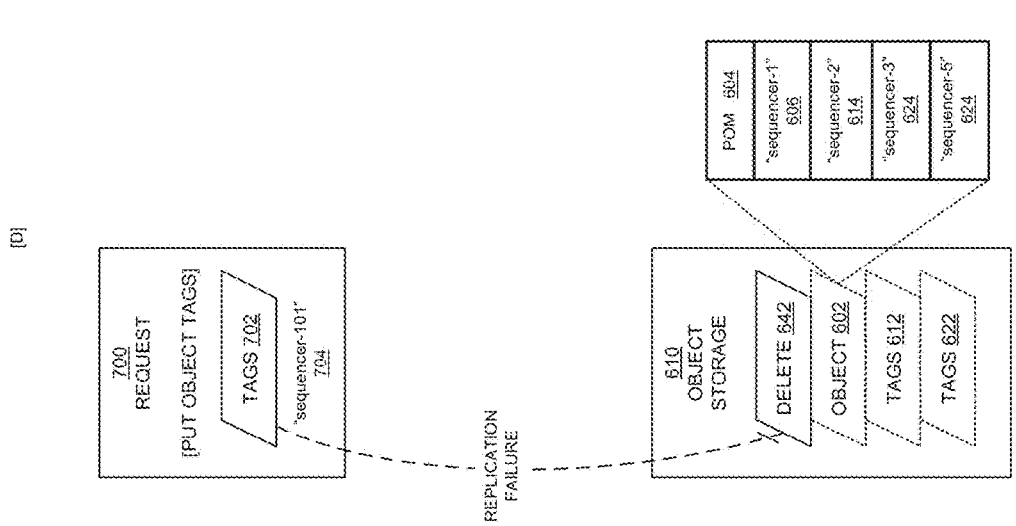

FIG. 7 illustrates examples of handling other requests as may occur in blocks of routine 500 different from the examples shown in FIG. 6. For example, at [D] request 700 may be a request to add tags 702 to a data object replica 602. The request 700 is associated with a sequencer 704 of "sequence-101." However, the data object replica 602 to which the request 700 applies is not present in the data storage bucket 610. As shown, this may be due to out-of-order execution of replication tasks in which a DeleteObject request to delete the data object replica 602 to which the tags 702 were to be applied has been processed prior to request 700. This may alternatively be due to out-of-order execution of replication tasks in which the PutObject request that would have put the data object replica in the data storage bucket 610 has not yet been processed.

As another example, at [E] request 720 may be a request to add tags 722 to a data object replica 602. As shown, the request 720 is associated with a sequencer 724 of "sequencer-105." However, the data object replica 602, as shown in POM 604, has had a PutObjectTag operation associated with sequencer 734 "sequencer-110" already performed. Tags 732 have been stored with data object replica 602. This may be due to out-of-order execution of replication tasks in which the PutObjectTag request that resulted in tags 732 being stored with data object replica 602 was executed prior to request 720, even though request 720 has an earlier sequencer 724. In this scenario, which corresponds to block 514 of routine 500, the destination storage node 222 may ignore the request 720, or reply to the replication client 164 that the replication task has completed successfully even though the request 720 is not being executed.

Example Storage Node

Figure 8:
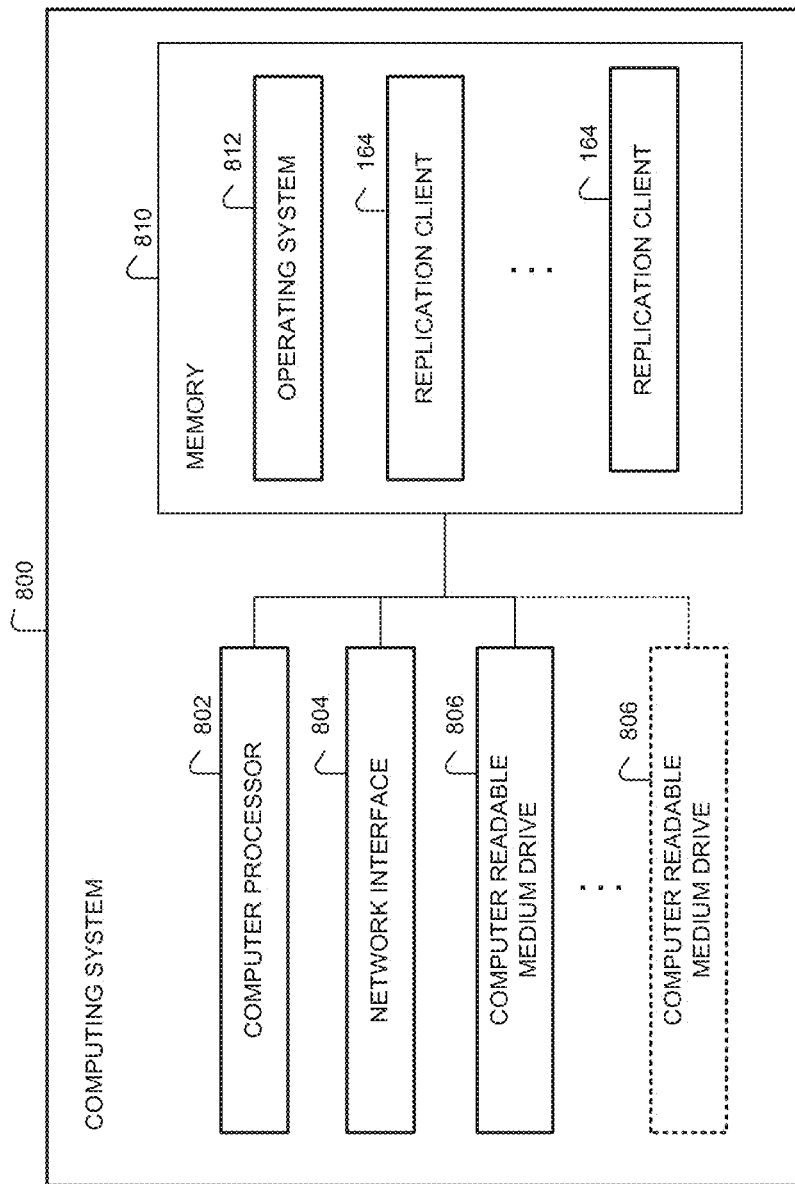
FIG. 8 is a block diagram of an illustrative computing device that may implement aspects of the present disclosure according to some embodiments.

FIG. 8 illustrates an example computing system 800 that may be used in some embodiments to execute the processes and implement the features of the storage nodes 154 (such as the source storage nodes 212 and destination storage nodes 222) described above. In some embodiments, the computing system 800 may include: one or more computer processors 802, such as physical central processing units (CPUs) or graphics processing units (GPUs); one or more network interfaces 804, such as a network interface cards (NICs); one or more computer readable medium drives 806, such as high density disks (HDDs), solid state drives (SSDs), flash drives, and/or other persistent non-transitory computer-readable media; and one or more computer readable memories 810, such as random access memory (RAM) and/or other volatile non-transitory computer-readable media. The network interface 804 can provide connectivity to one or more networks or computing devices. The computer processor 802 can receive information and instructions from other computing devices or services via the network interface 804. The network interface 804 can also store data directly to the computer-readable memory 810. The computer processor 802 can communicate to and from the computer-readable memory 810, execute instructions and process data in the computer-readable memory 810, etc.

The computer-readable memory 810 may include computer program instructions that the computer processor 802 executes in order to implement one or more embodiments. The computer-readable memory 810 can store an operating system 812 that provides computer program instructions for use by the computer processor 802 in the general administration and operation of the computing system 800. The computer-readable memory 810 can also include computer program instructions for implementation of one or more replication clients 164.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A distributed storage system comprising:
   a cloud provider network comprising a first set of computing resources configured to provide cloud-based computing services to customers;
   a source provider network extension comprising a second set of computing resources configured to provide first on-premise computing services at a first customer site corresponding to at least a portion of the cloud-based computing services provided by the first set of computing resources; and
   a destination provider network extension comprising a third set of computing resources configured to provide second on-premise computing services at a second customer site corresponding to at least a portion of the cloud-based computing services provided by the first set of computing resources;
   wherein the source provider network extension is configured to:
   receive a request to store a data object in an object storage bucket maintained by the source provider network extension;
   generate a sequence identifier for a replication marker based on a monotonically-changing sequence identifier generation algorithm;
   commit a transaction comprising persistently saving the data object to the object storage bucket and saving a crash consistent replication marker to a crash consistent replication queue in a first persistent storage directory for replication tasks awaiting execution, wherein the crash consistent replication marker comprises the sequence identifier, an identifier of a replication task for replicating the data object to the destination provider network extension, and a link to the data object at the object storage bucket;
   dequeue the crash consistent replication marker from the crash consistent replication queue by moving the crash consistent replication marker to a second persistent storage directory for in-process replication tasks;
   initiate replication of the data object to the destination provider network extension based on the crash consistent replication marker; and
   move the crash consistent replication marker to a third persistent storage directory based on a response from the destination provider network extension regarding replication of the data object.

2. The distributed storage system of claim 1, wherein the source provider network extension is further configured to determine to generate the crash consistent replication marker based on a first replication rule of a plurality of replication rules associated with the object storage bucket, wherein the crash consistent replication queue is associated with the first replication rule, and wherein a second crash consistent replication queue is associated with a second replication rule of the plurality of replication rules.

3. The distributed storage system of claim 1, wherein the source provider network extension is further configured to access the crash consistent replication marker in the first persistent storage directory after a restart of a computing resource of the second set of computing resources.

4. The distributed storage system of claim 1, wherein the response from the destination provider network extension indicates failure to replicate the data object to the destination provider network extension, and wherein the source provider network extension is further configured to:
   determine to retry replication of the data object based on at least one of: a type of failure to replicate the data object, or a quantity of prior retry attempts to replicate the data object; and
   move the crash consistent replication marker to the first persistent storage directory.

5. A computer-implemented method comprising:
   under control of a storage system comprising one or more computing devices configured to execute specific instructions:
   generating a sequence identifier for a replication marker based on a monotonically-changing sequence identifier generation algorithm;

committing a transaction comprising saving a data object to a persistent object storage location and saving the replication marker to a first persistent storage directory for pending replication tasks, wherein the replication marker comprises the sequence identifier, an identifier of a replication task for replicating the data object to a remote storage system, and a link to the data object at the persistent object storage location, and wherein the first persistent storage directory comprises a replication queue;

determining, based on a presence of the replication marker in the first persistent storage directory, to dequeue the replication marker from the replication queue;

moving the replication marker to a second persistent storage directory for in-process replication tasks;

attempting replication of the data object to the remote storage system; and moving the replication marker to a third persistent storage directory based on a result of attempting replication of the data object to the remote storage system.

6. The computer-implemented method of claim 5, further comprising committing a second transaction comprising saving tag data with the data object in the persistent object storage location and saving a second replication marker to a fourth persistent storage directory for pending tag data replication tasks, wherein the second replication marker comprises second replication data for replicating the tag data to the remote storage system, and wherein the fourth persistent storage directory comprises a second replication queue.

7. The computer-implemented method of claim 5, further comprising committing a second transaction comprising saving deletion data for deleting the data object in the persistent object storage location and saving a second replication marker to a fourth persistent storage directory for object deletion replication tasks, wherein the second replication marker comprises second replication data for replicating the deletion data to the remote storage system, and wherein the fourth persistent storage directory comprises a second replication queue.

8. The computer-implemented method of claim 5, further comprising rolling back a second transaction based on a failure to save a second replication marker to the first persistent storage directory.

9. The computer-implemented method of claim 5, further comprising receiving, from the remote storage system, a replication response reporting the result of attempting replication of the data object, wherein the replication response indicates a successful replication of the data object, and wherein moving the replication marker to the third persistent storage directory comprises moving the replication marker to a persistent storage directory for storage of replication markers for successful replication tasks.

10. The computer-implemented method of claim 5, further comprising receiving, from the remote storage system, a replication response reporting the result of attempting replication of the data object, wherein the replication response indicates a failure to replicate the data object, and wherein moving the replication marker to the third persistent storage directory comprises moving the replication marker to a persistent storage directory for storage of replication markers for failed replication tasks.

11. The computer-implemented method of claim 10, further comprising:

determining to retry replication of the data object based on at least one of: a type of failure to replicate the data object, or a quantity of prior retry attempts to replicate the data object; and moving the replication marker to the first persistent storage directory.

12. The computer-implemented method of claim 10, further comprising:

determining to abort replication of the data object based on at least one of: a type of failure to replicate the data object, or a quantity of prior retry attempts to replicate the data object; and moving the replication marker to a fourth persistent storage directory for aborted replication tasks.

13. The computer-implemented method of claim 10, further comprising:

determining a first amount of a computing resource to be available at the remote storage system before retrying replication of the data object, wherein the first amount is at least a threshold amount greater than a second amount of the computing resource required to replicate the data object; and retrying replication of the data object to the remote storage system based on the second amount of the computing resource becoming available at the remote storage system.

14. The computer-implemented method of claim 5, further comprising accessing the replication marker in one of the first persistent storage directory or the second persistent storage directory after a restart of a computing resource of the storage system.

15. The computer-implemented method of claim 5, further comprising determining to generate the replication marker based on a first replication rule of a plurality of replication rules associated with the persistent object storage location, wherein the replication queue is associated with the first replication rule, and wherein a second replication queue is associated with a second replication rule of the plurality of replication rules.

16. The computer-implemented method of claim 5, further comprising generating a plurality of replication markers based on a replication rule associated with the persistent object storage location, wherein the replication rule specifies that the data object is to be replicated to a plurality of remote storage systems, and wherein each replication of the plurality of replication markers is associated with a different remote storage system of the plurality of remote storage systems.

17. The computer-implemented method of claim 5, further comprising:

generating the replication marker comprising:

a metadata file comprising the sequence identifier, an identifier of the remote storage system, and the identifier of a replication task to be performed; and a hard link to the data object at the persistent object storage location.

18. A system comprising:

computer-readable memory storing executable instructions; and one or more computing devices programmed by the executable instructions to at least:

generate a sequence identifier for a replication marker based on a monotonically-changing sequence identifier generation algorithm;

commit a transaction comprising saving a data object to a persistent object storage location and saving the replication marker to a first persistent storage directory for pending replication tasks, wherein the replication marker comprises the sequence identifier, an identifier of a replication task for replicating the data object to a remote storage system, and a link to the data object at the persistent object storage location, and wherein the first persistent storage directory comprises a replication queue;

determine, based on a presence of the replication marker in the first persistent storage directory, to dequeue the replication marker from the replication queue;

move the replication marker to a second persistent storage directory for in-process replication tasks;

attempt replication of the data object to the remote storage system; and move the replication marker to a third persistent storage directory based on a result of attempting replication of the data object to the remote storage system.

19. The system of claim 18, wherein the attempt to replicate the data object occurs after the transaction is committed.

20. The system of claim 18, wherein the one or more computing devices are further programmed by the executable instructions to:

determine a first amount of a computing resource to be available at the remote storage system before retrying replication of the data object, wherein the first amount is at least a threshold amount greater than a second amount of the computing resource required to replicate the data object; and retry replication of the data object to the remote storage system based on the second amount of the computing resource becoming available at the remote storage system.

* * * * *